United States Patent Office 3,421,734
Patented Jan. 14, 1969

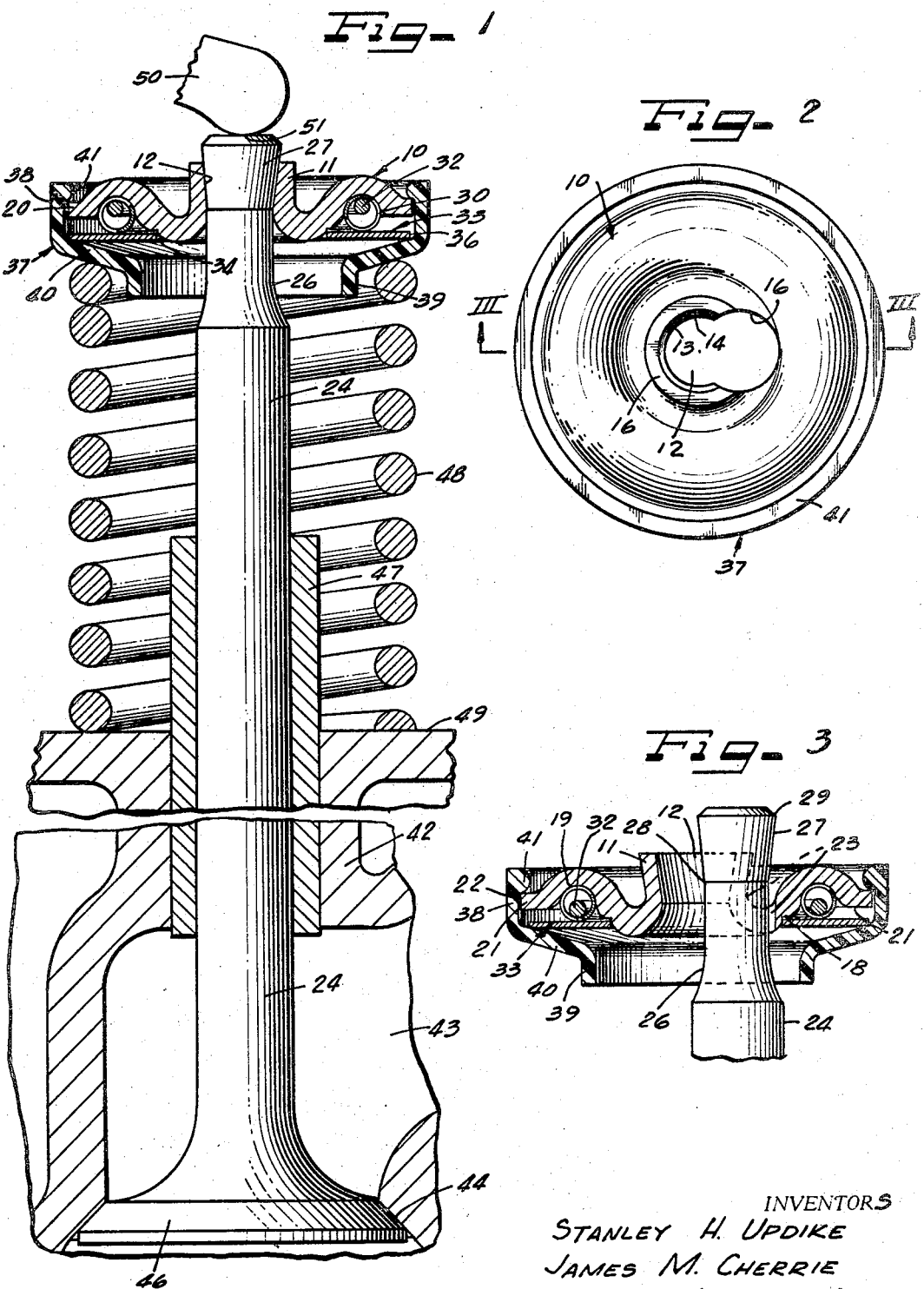

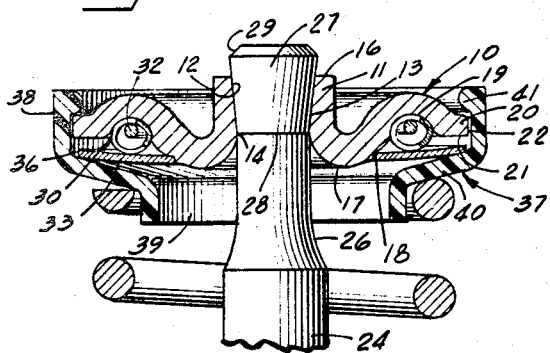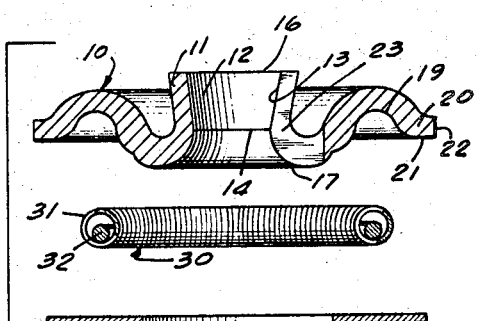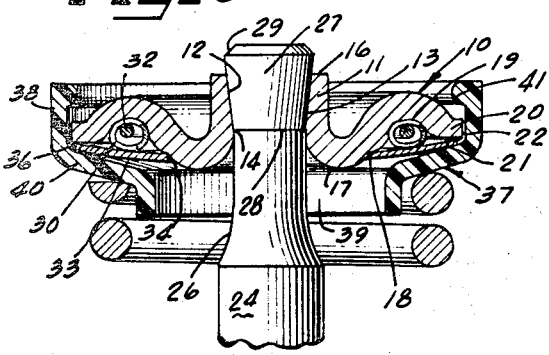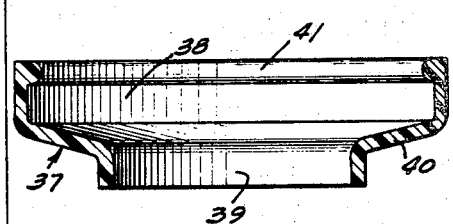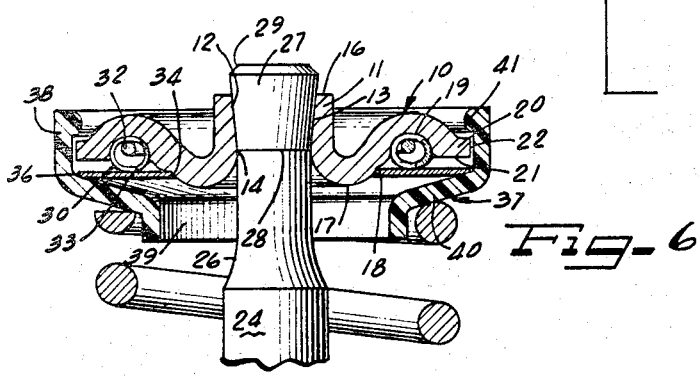
INVENTORS
STANLEY H. UPDIKE
JAMES M. CHERRIE
WILLIAM ARTHUR MICHAELS
ATTORNEYS

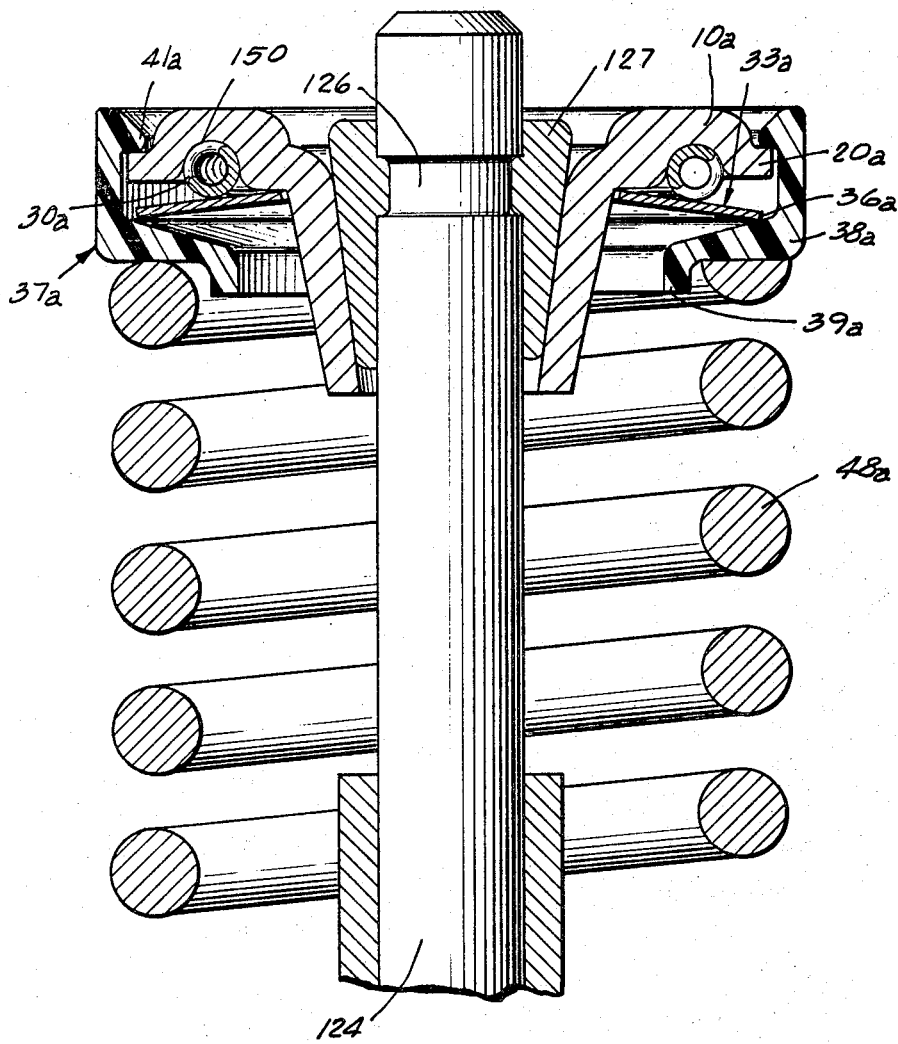

3,421,734
VALVE ROTATING DEVICE
Stanley H. Updike, Mentor, James M. Cherrie, Euclid, and William A. Michaels, Warrensville Heights, Ohio, assignors to TRW Inc., Cleveland, Ohio, a corporation of Ohio
Filed Dec. 22, 1965, Ser. No. 515,696
U.S. Cl. 251—337     12 Claims
Int. Cl. F16k *31/00;* F16k *29/00;* F01l *3/10*

ABSTRACT OF THE DISCLOSURE

A valve rotating device has a nylon collar which is snap-fit over the outside diameter of the body by means of an internal bead. The body member has an integral taper valve lock and an initially flat spring washer, thereby providing a valve rotating device applicable to valve constructions having thin diameter stems, for example, single cylinder utility engines.

---

In valve rotator devices heretofore provided, components of prohibitive cost have been employed insofar as thin stemmed valves used in single cylinder utility engines are concerned. One of the high cost items in such prior art devices has been the so-called conical spring washer which requires precise manufacture of the conical height.

In accordance with the principles of the present invention, a spring system consisting of a slightly open wound garter spring in circular contact with initially flat spring washer is provided. The garter spring is confined by an annular pocket located in the body member in a manner to permit a slight interference contact between the garter sping and the flat washer. The body member is, in turn, locked to the valve stem by an integral taper valve lock and the flat spring washer is piloted by the body member at its inside diameter. The body, garter spring and washer are retained as an assembly by a nylon collar which is snap-fit over the body outside diameter by means of an internal bead in the collar. In addition, the collar serves to support the flat washer as well as to pilot and retain the valve spring.

The use of the plastic collar implements the use of automated assembly requiring minimum of part orientation.

It is an object of the present invention, therefore, to provide a valve rotator device which overcomes size limitations imposed on valve rotators because of the usual locking devices used for retention.

Another object of the present invention is to provide a valve rotating device which obviates the necessity of using high cost components and which facilitates implementation of modern automated assembly techniques.

A still further object of the present invention is to provide an improved valve rotator device which can be effectively utilized on thin-stemmed valves such as those used in single cylinder utility engines.

Many other features, advantages and additional objects of the present invention will become manifest to those versed in the art upon making reference to the detailed description which follows and the accompanying sheets of drawings in which a structural embodiment of the present invention is shown by way of illustrative example and from which the novel methods of the present invention will be understood.

On the drawings:
FIGURE 1 is a cross-sectional view with parts shown in elevation illustrating a valve assembly of an internal combustion engine and utilizing the valve rotator assembly of the present invention;

FIGURE 2 is a top plan elevational view of the valve rotating device provided in accordance with the principles of the present invention;

FIGURE 3 is a cross-sectional view of the valve rotator showing the same in the course of assembly with the tip of a thin-stemmed valve used, for example, in single cylinder utility engines and the components of the valve rotating device in FIGURE 3 are shown in a free position wherein the coils of the garter spring are circularly disposed and the spring washer is in a flat configuration;

FIGURE 4 is a cross-sectional view showing the valve rotating device components in a valve-closed position wherein the garter spring coils are slightly elliptical and the spring washer has been curved to a slightly conical shape;

FIGURE 5 is a view similar to FIGURE 4 and showing the valve rotating device prior to a valve-open position wherein the coils of the garter spring are fully elliptical and the spring washer is fully curved to a conical configuration and angular indexing of the body and valve has been completed;

FIGURE 6 is a view similar to FIGURES 4 and 5 but showing the valve rotating device in a recovery valve seated position wherein the garter spring is released and reset for the next cycle;

FIGURE 7 is an exploded view showing the components of the valve rotating device ready for assembly; and FIGURE 8 is a view similar to FIGURE 1 but showing the plastic collar arrangement of the present invention applied to a valve rotating device using a so-called Belleville spring washer.

As shown on the drawings:

Thin-stemmed valves such as those used in single cylinder utility engines have stem diameters in the order of about .250 inch. Accordingly, presently existing valve rotator devices have not been applicable to such thin-stemmed valves due to the size limitation of the locks used for retention of the valve rotating devices on the tip of the stem. For example, some prior art devices use a tapered split lock which cannot be used with such thin-stemmed valves.

Further, since single cylinder utility engines are of economic construction, current rotator devices employing components of prohibitive cost cannot be reasonably included as standard equipment. One of the components of prohibitive cost in a so-called garter spring type valve rotator, is the Belleville or conical spring washer due to the precision manufacture of the conical height.

Both of the problems thus presented have been successfully overcome in accordance with the principles of the present invention by providing a valve rotating device shown in specific detail in FIGURES 2 and 7.

A body member for the valve rotator is shown generally at 10 and is fabricated by shaping a flat blank into a generally annular form which is particularly characterized by an integral taper valve lock at the center. More specifically, it will be noted that the body member 10 has an axially extending hub portion 11 formed with an axial through opening 12 and the side walls of the opening 12 are shown at 13 tapered from a narrow throat portion 14 to diverge outwardly to an upper edge 16, thereby forming a taper lock.

From the throat 14, the body member 10 is shaped in a transition curve 17, thereby to extend in a general radial direction and forming an annular notch 18 radially outwardly of the hub portion 11, which notch 18 forms a pilot gap having limited axial extent.

Radially outwardly of the pilot gap or notch 18, the body member 10 extends upwardly and outwardly, thereby to form a circumferentially continuous annular pocket 19 and the body member terminates in a peripheral radial flange 20 having a flat bottom wall 21 and an axial peripheral wall 22.

As is clearly shown in FIGURE 2 as well as FIGURE 6, a circular through opening 12 is formed in the body member 10, the outermost extremity of which terminates at approximately the notch or pilot gap 18 and the innermost extremity of which intersects the taper lock provided by the opening 12. Thus, the opening 23 permits a valve stem to be assembled with the body member 10 by insertion of the tip thereof through the opening 23, whereupon the body member 10 is moved sideways for effecting a wedge taper lock assembly with the tip of the valve stem.

In this regard, note that a valve stem is shown at 24 and has a reduced throat section 26 as well as a tapered tip portion shown generally at 27 and diverging outwardly from a throat 28 to an end portion 29.

In FIGURE 3, the valve stem 24 is shown with the tip 29 extended through the opening 23 and it will be noted that the taper 27 cooperates with the taper 13, thereby to lock the body member 10 in co-rotatable assembly with the valve stem 24.

Received within the pocket 19 of the body member 10 is a garter spring shown generally at 30. The spring 30 constitutes a plurality of slightly open wound coils 31 and a retainer 32 is loosely received within the interior of the coils.

The garter spring is confined in the annular pocket 19 in a manner to permit a slight interference contact between the garter spring 30 and a flat spring washer shown generally at 33 and constituting an article fabricated by direct stamping using pre-hardened and tempered flat spring stock. Thus, the spring washer 33 has a washer configuration including an inner annular edge 34 and an outer annular edge 36. Its flat faces on opposite sides thereof are parallel to one another.

In order to retain the body member 10, the garter spring 30 and the washer 33 in assembly with one another, a collar is utilized which is shown generally at 37. The collar 37 is preferably made of a synthetic plastic material such as nylon and includes in a single integral article an outer axial wall 38 and an inner axial wall 39 disposed in concentric relation to one another joined by a generally radially extending somewhat tapered wall 40.

The outer axial wall 38 is particularly characterized by an internal bead 41 which projects radially inwardly, thereby to form an abutment preferably sized to be of a smaller diameter than the axial wall 22 of the body member 10. Accordingly, the collar 37 may be snap-fit over the body 10.

The plastic collar has utility when applied to other forms of valve rotating devices, since it can be utilized in assemblies wherein the shiftable elements constitute balls as in prior art rotating devices, or the coils of garter springs, as in the present disclosure.

Moreover, the use of the nylon collar is also feasible even though one of the valve rotator components constitutes a so-called Belleville spring washer, as in the prior art valve rotators, or a flat spring washer as herein disclosed.

In FIGURE 8, that alternative arrangement is illustrated and corresponding reference numerals with the suffix "a" are used to identify like parts.

Instead of a flat spring, the nylon collar 37a is shown formed with outer side walls 38a and an inner axial wall 39a concentrically disposed with respect to one another and joined by a bottom wall 40a having an outer surface engaged by a valve spring 48a and an inner surface engaged by the outer edge 36a of a Belleville spring washer 33a. The washer 33a is conical in configuration, tapering upwardly and inwardly from the outer edge 36a to its inner edge 34a which engages the body member 10a.

In this form of the invention, the body member has a center portion 11a which is tapered to cooperate with locking members 127 engaging a valve stem 124 suitably recessed at 126. The body member 10a has an outer flange 20a which cooperates with the internal bead 41a projecting inwardly from the outer wall 38a, thereby permitting automated snap-on assembly of the rotator components.

It will be understood that the body 10a is formed with an appropriate track or guideway 150 for the reception of suitable shiftable elements 30a, such as balls, or, as herein illustrated, the coils of a garter spring 30a.

In the operation of the device of FIGURE 8, normal spring loads are transmitted via the Belleville spring washer 33a between the spring 48a and the body 10a, but increased spring loading bows the spring washer 33a over the shiftable elements, thereby producing a shift necessary to provide incremental rotation of the adjacent parts.

When assembled with a valve mechanism, the valve rotating device will be situated in an operating environment in the manner shown in FIGURE 1. As shown in FIGURE 1, an engine part 42 has a port 43 formed with a valve seat 44 controlled by a valve head 46 carried on the end of the valve stem 24. The stem is slidably supported in a valve guide 47.

A valve spring 48 has the coils thereof bottomed against a wall 49 of the engine part 42 and the opposite end of the coil springs 48 engages against the wall 40 of the collar 37.

A valve actuator 50 includes an actuating surface 51 which engages against the tip of the valve stem 24, thereby to regulate the opening and closing movements of the valve head 46 relative to the valve seat 44 and hence the flow of gases through the port 43.

The operation of the valve rotating device may be readily understood from a consideration of the drawings showing the different phases of operation.

In the unloaded or free position depicted in FIGURE 3, the washer 33 is flat, resting inside the collar 37, and in contact with the garter spring 30. Hence there are essentially only two contact points, namely, the contact between the outer edge 36 of the washer 33 and the wall 40 of the collar 37 and the second contact between the washer 33 and the coils of the garter spring 30. The inner edge 34 of the washer in the free position is positioned freely within the pilot gap formed by the notch 18.

As the load is applied during the course of a valve opening operation and the actuator 50 moves against the tip of the stem, as at 51, to move the valve head 46 away from the valve seat 44, the flat washer 33 will contact the body member 10 at the bottom of the notch 18, thereby closing the pilot gap and the flat washer 33 will then begin to deflect by bowing over the coils of the garter spring 30, as shown in FIGURE 4. Thus, the exact reverse of the conventionally formed Belleville spring is effected, wherein the motion is from conical to flat.

At the initiated load, valve-closed position and early in the lift cycle, as shown in FIGURE 4, a relatively large washer deflection occurs with the garter spring 30 becoming somewhat elliptical in cross-sectional configuration, partially supporting the load, while the remainder of the load is supported by the body 10.

As the washer 33 load is increased due to further valve opening, there is proportionately less washer deflection with increasing garter spring reaction until the coils 31 of the garter spring 30 suddenly collapse, as shown in FIGURE 5. A rotating torque is transmitted to the body 10 by the garter spring 30 as a result of the tipping of the coils 31 during this action resulting in annular indexing of the body 10 and the valve 24, 46.

As shown in FIGURE 6, release is achieved when the system is unloaded and the garter spring 30 is reset for the next cycle.

It will be apparent, therefore, that normal spring loads are transmitted via the coils of the garter spring 30 and through the spring washer 33, however, when the spring washer 33 is bowed over the coils 31 of the garter spring 30 in response to increased valve loading, the coils 31 will eventually tip, thereby rotatably driving the valve parts relative to one another.

The arrangement thus provided affords many advantages. Great economy of manufacture is possible through the use of the stamped flat spring washer and the formed body member. Moreover, the components have such characteristics that automated assembly is possible since a minimum of orientation is required due to the snap-fit feature for final assembly of the components. Moreover, by incorporating an integral taper lock with a keyhole opening in the body of the rotator, assembly and retention are possible for thin diameter valve stems.

Although minor modifications might be suggested by those versed in the art, it should be understood that we wish to embody within the scope of the patent warranted hereon all such modifications as reasonably and properly come within the scope of our contribution to the art.

We claim as our invention:

1. A valve rotating device comprising,
  a body member having
    an outer peripheral flange,
    an annular pocket inwardly of said flange,
    an annular pilot gap formed by a notch located inwardly of said pocket,
    and an integral taper valve lock inwardly of said pilot gap,
  a nylon collar having an outer axial flange formed with a radially inwardly extending internal bead snap-fit into engagement with said flange,
  said collar having a tapered radially inwardly extending frusto-conical wall and an inner axial flange,
  a garter spring received in said annular pocket and having coils extending axially outwardly of said annular pocket,
  and a flat spring washer having its outer edge engaging said tapered wall and its inner edge engaging said body member at said notch,
    whereby the outwardly extending coils of said garter spring initially in contact with the flat spring washer will deflect the washer over the spring towards a conical position in response to increased valve loading to tip the coils of the spring and rotatably drive the body member relative to the collar.

2. For use in a valve assembly having inner and outer parts,
  a body member having an annular pocket and an integral tapered valve lock concentrically disposed relative to one another,
  a garter spring in said pocket having coils extending out of said pocket,
  a normally flat spring washer having its inner edge engaging said body member,
  and an internally beaded collar overlying said spring washer and surrounding said body member, said collar made of plastic material and having means snap-fit over said body member to hold the body member, garter spring and flat spring washer in assembly,
    said washer deflecting temporarily in response to increased valve load to bow the washer over the garter spring,
      thereby gradually increasing garter spring reaction while proportionately reducing washer deflection to tip the extending coils of the garter spring and transmit a rotating torque for angularly indexing the parts.

3. The invention of claim 2 wherein said body member has an integral taper valve lock consisting of a hub portion formed with a tapered bore, and an opening adjacent said hub portion and intersecting said bore through which a valve stem is inserted in taper lock assembly with said body member.

4. For use with thin diameter valve stems,
  a valve rotator of the garter spring type comprising a body member and a normally flat spring washer member having its inner edge engaging said body member,
  and an internally beaded plastic collar having a frusto-conical wall portion engaging the outer edge of said washer member and means on said collar engaging said body member and cooperating with said frusto-conical wall portion of the collar to hold said members in assembly with the garter spring.

5. For use with thin diameter valve stems,
  a valve rotator as defined in claim 5 and further characterized by an integral tapered valve lock formed at the center of said body member locking the valve rotator on the valve stem.

6. A valve rotator comprising,
  a body member made of a flat metal blank shaped to form a center axially extending hub,
    said hub having an axial through opening for receiving a valve stem,
    the walls of said opening being tapered to form a wedge lock to engage said body member in firm assembly with a correspondingly tapered portion of a valve stem,
    said body member including a portion extending radially outwardly from said hub and forming an annular notch providing a pilot gap outwardly of said hub,
    said body member further including a portion extending radially outwardly from said annular notch and forming an annular curved pocket and terminating in a peripheral radial flange,
  a collar made of nylon material and shaped to form concentrically disposed inner and outer axial walls interconnected by a tapered radially extending frusto-conical wall,
    said outer wall having an internal bead snap-fitting around said radial flange of said body member,
  a garter spring in said pocket and having the coils thereof projecting out of said pocket beyond the plane of said flange,
  and a normally flat spring washer having an inner edge engaged with said body member and said notch forming said pilot gap and having an outer edge engaging said tapered wall adjacent said outer axial wall,
    whereby normal valve spring loads will be transmitted via the outwardly extending coils of said garter spring through said flat spring washer, and increased valve spring loads will bow said flat spring washer over said garter spring to tip the coils thereof and transmit a rotating torque between the body member and the collar.

7. A valve rotating device comprising
  a spring system consisting of a slightly open wound garter spring,
  an initially flat spring washer in circular contact with said garter spring,
  a body member having an annular pocket confining said garter spring,
    said garter spring having coils projecting out of said annular pocket for effecting a slight interference contact between the garter spring and the flat washer,
    said body member having an integral taper valve lock at its inside diameter for locking the body to a valve stem,
  and an internally beaded nylon collar overlying said spring washer and surrounding said body member and having means snap-fit over the body member to retain the body member, garter spring and washer in assembly and adapted to support the flat washer and to pilot and retain a valve spring.

8. For use with a reciprocating poppet valve assembly,
  a plastic collar having inner and outer concentrically disposed axially extending walls and a bottom wall of frusto-conical configuration joining said inner and outer axial walls and adapted to engage a valve spring, a valve rotating device comprising a body member and shiftable elements and being disposed inside of said collar, said outer wall of said plastic collar being internally beaded and snap-fit on said body member to retain said valve rotating device in assembly with said collar.

9. The invention of claim 8 and further characterized by said shiftable elements comprising plural coils of a garter spring.

10. The invention of claim 8 and further characterized by said valve rotating device comprising a flat washer made of spring metal interposed between the bottom wall of said plastic collar and said shiftable elements, said flat washer responding to increased load and deflecting to a conical shape, whereupon shifting of said shiftable elements will transmit a torque to rotate the valve.

11. The invention of claim 8 and further characterized by said valve rotating device comprising a Belleville spring consisting of a conical spring washer interposed between the bottom wall of said collar and said shiftable elements, said Belleville spring washer transmitting normal spring load but deflecting under increased spring load towards a flattened shape, whereupon shifting of said shiftable elements will transmit a torque to rotate the valve.

12. The invention of claim 8 and further characterized by said body member having an integral tapered valve lock at the center thereof for wedging engagement with the correspondingly tapered stem of a thin stemmed valve.

References Cited

UNITED STATES PATENTS

| | | | |
|---|---|---|---|
| 1,193,738 | 8/1916 | Thoms | 251—337 |
| 2,397,502 | 4/1946 | Ralston | 123—188 |
| 2,758,583 | 8/1956 | Norton | 123—90 |
| 2,801,039 | 7/1957 | Arneson | 215—41 XR |
| 2,827,886 | 3/1958 | Geer | 123—90 |
| 3,080,991 | 3/1963 | Fox | 215—41 |

HENRY T. KLINKSIEK, *Primary Examiner.*

U.S. Cl. X.R.

123—90